![United States Patent Office]

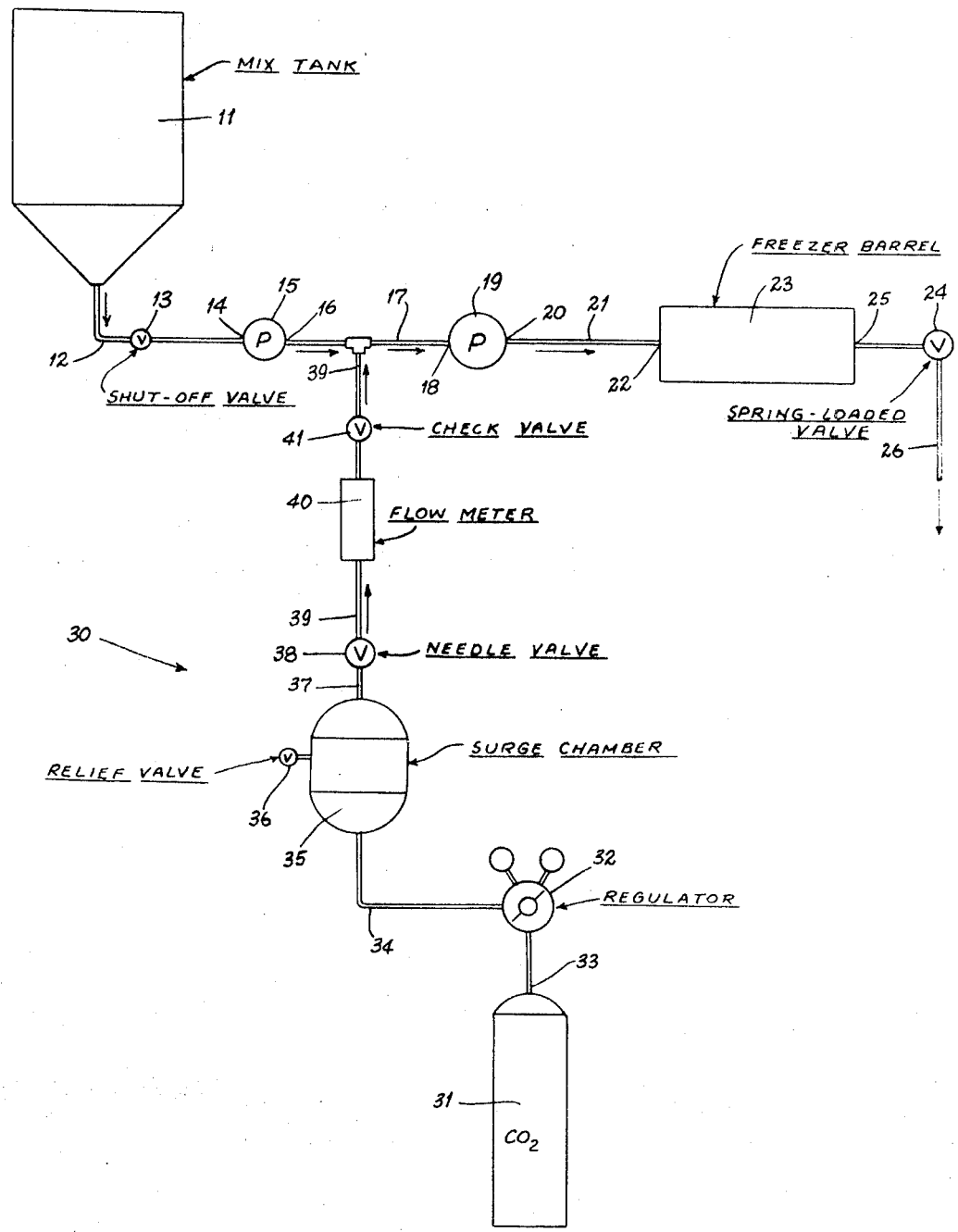

3,470,706
Patented Oct. 7, 1969

3,470,706
MACHINE FOR MAKING CARBONATED DESSERTS
Orville Mitchell, Dallas, Tex., Irving H. Rubenstein, Owings Mills, Md., and Richard L. Roden and Russell L. Johnson, Dallas, Tex., assignors to John E. Mitchell Company, Dallas, Tex., a corporation of Missouri
Filed Oct. 16, 1967, Ser. No. 675,500
Int. Cl. F25d 17/00; F25c 7/16; F04b 11/00
U.S. Cl. 62—179                                4 Claims

ABSTRACT OF THE DISCLOSURE

A carbon dioxide injection system for connection to a continuous flow ice cream or frozen dessert making machine to produce carbonated ice cream or frozen dessert, and a continuous flow machine for making ice cream or frozen dessert. Pulsation dampening means and flow control means are incorporated in the carbon dioxide injection system. The ice cream making machine has two pumps connected in series with the downstream one being of greater capacity than the upstream one, and the injection system delivers carbon dioxide to a point between the two pumps.

BRIEF DESCRIPTION OF THE INVENTION

This injection system provides a successful means for carbonating an ice cream, sherbert, water-ice or similar product while avoiding interference with the normal continuous-flow production of frozen product in a standard ice cream making machine. In such a standard machine, individual ingredients are mixed in a mix tank and pumped to a freezer where the ingredient mixture is refrigerated and whipped under elevated pressure to produce the final product. From the freezer barrel, the frozen product is substantially continuously driven by the ingredient pump means to suitable packaging equipment. A spring-loaded valve on the outlet of the freezer barrel is adjustable to control the pressure in the barrel. The spring pressure is adjusted to close the valve when the pressure is low, when the incompletely filled barrel is being filled by the pump means, and to open when the pressure is at the proper level corresponding to proper ingredient volume within the barrel. The foregoing outlines a typical conventional machine for making ice cream or other frozen or partly frozen dessert.

In this invention, two pumps are required. The second pump is connected in series with the first and works faster to increase the capacity of the system. Carbon dioxide is fed into the system between the two pumps. The carbon dioxide feeding system comprises a tank containing carbon dioxide under pressure. A regulator controls the pressure at the tank outlet from where the carbon dioxide is fed to a surge chamber or accumulator. The accumulator dampens pulses resulting from the tumbling action of the freezer and maintains a substantially constant pressure load on the carbon dioxide regulator. At the outlet of the surge chamber, a needle valve regulates the rate of flow of the carbon dioxide and provides enough restriction to maintain a slight positive pressure in the accumulator. Preferably, there is a flow meter in the carbon dioxide pipe to provide flow rate readings and confirm settings of the needle valve. From the needle valve, the carbon dioxide is fed through a check valve to the ingredient pipe between the two pumps.

Since the second pump operates faster than the first pump (which is upstream of the second pump) there is a negative suction pressure between the two pumps. This suction pressure draws the carbon dioxide into the ingredient pipe where the carbon dioxide and mix ingredients are blended together. Further mixing and carbonation of the frozen product occurs in the freezer barrel, which has a beater or agitator for whipping the frozen dessert. Thus, the frozen dessert discharged from the freezing barrel is uniformly carbonated and its flavor enhanced.

This uniform carbonation is a particularly important result of the present invention. In the pumping system of standard ice cream machines, liquid pulsations inherently occur, producing continuously variable pressures on opposite sides of each pump. Such pressure variations imparted directly to the pressure regulator at the $CO_2$ tank outlet would upset the normal function of the pressure regulator and produce variations in the pressure of carbon dioxide supplied to the frozen dessert ingredients. The result is uneven and nonuniform mixing of carbon dioxide with the other ingredients. This problem is solved in the present invention by the installation of the surge chamber, which dampens variations in pump pressure and maintains a substantially constant pressure on the $CO_2$ tank outlet regulator.

In addition to the foregoing, an important concept of the invention is the introduction of the carbon dioxide into the ingredient pipe at a point between the first and second pumps. Since the second pump runs faster than the first, it creates a suction pressure in the pipe between them. This suction pressure draws carbon dioxide into the ingredient pipe for mixture with the frozen dessert ingredients. Introduction of the carbon dioxide downstream of the second pump produces some carbonation, but the process is difficult to control because of high pressures encountered at this point of introduction. Introduction of the carbon dioxide upstream of the first pump is unsuccessful also because this part of the system is not confined but rather is in free communication with the open mix tank, and because the full demand of the first pump can be met by the ingredients available at the mix tank. By connecting the carbon dioxide supply to the intermediate pipe between the two pumps, the first pump can be set to control the rate of flow of frozen dessert ingredients and the second pump can be set to draw the frozen dessert ingredients and control the rate of addition of carbon dioxide to the ingredients.

Thus, the carbon dioxide is introduced at a point where the frozen dessert ingredients flow at a controlled rate but where a suction pressure from the second pump draws the carbon dioxide into mixture with the frozen dessert ingredients. At the same time, the flow of the carbon dioxide is regulated by the needle valve to a rate that corresponds properly with the rate of flow of the frozen dessert ingredients as controlled by the first pump. In addition, the surge chamber prevents pulsations of the pump from affecting proper operation of the regulator at the $CO_2$ tank outlet. The resulting consistently proportioned mixture of ingredients and carbon dioxide is whipped and refrigerated in the freezer barrel to discharge flavor-enhanced carbonated frozen dessert. And all the foregoing can and does take place in a continuous flow system.

A particular feature of this invention is that the carbon dioxide injection system can be separately manufactured and connected to an existing conventional ice cream making machine to convert that machine to one which manufactures carbonated frozen desserts.

BRIEF DESCRIPTION OF THE DRAWING

The drawing is a schematic flow diagram of the carbonated frozen dessert production system.

DETAILED DESCRIPTION OF THE INVENTION

In this carbonated frozen dessert producing system 10, there is a tank 11 where the mixture of the ice cream or dessert ingredients, such as water solutions, ice cream, ice milk mix, or sherbert mix, etc., are kept in constant supply. A pipe 12 leads from the mix tank 11 through a shut off valve 13 to the inlet 14 of a first pump 15. The outlet 16 from the first pump 15 is connected by a pipe 17 to the inlet 18 to a second pump 19. The outlet 20 from the second pump 19 is connected by another pipe 21 to the inlet 22 of a freezer barrel 23. There is a spring loaded discharge valve 24 connected to the outlet 25 of the freezer barrel 23, and a pipe 26 leads from the valve 24 to any suitable conventional continuously operating ice cream packaging equipment.

The freezer barrel is of the conventional design, having refrigerating means for reducing the temperature of the contents within the barrel to any desired adjustable level and having a suitable agitator or beater for whipping the barrel contents as they are refrigerated. The spring loaded outlet valve 24 maintains a minimum pressure within the barrel 23 above atmospheric pressure as is created by operation of the pumps 15 and 19. The spring loaded valve 24 can be set for any desired minimum pressure within the freezer barrel. During normal operation of the system, the pressure in the freezer barrel 23 is maintained at about 60 p.s.i.g. and the temperature at about 28° F.

As to the pumps 15 and 19, it is important that the second pump 19 have greater capacity than the first pump 15. This has the advantage of providing a low pressure location (between the two pumps) for connection of the carbon dioxide injection system.

The carbon dioxide injection system 30 comprises a carbon dioxide tank 31 with a pressure regulator 32 connected to its outlet 33. The tank 31 and regulator 32 are conventional. To operate properly, the pressure downstream of the regulator 32 must be substantially constant. For this purpose, a pipe 34 leading from the regulator 32 is connected to a surge chamber or accumulator 35. The surge chamber 35 may be of any conventional design for maintaining substantially constant pressure on its upstream side (within the pipe 34) even though there may be pressure variations or pulsations on its upstream side. The surge chamber 35 typically has a pressure relief valve 36.

A pipe 37 leads from the surge chamber to a needle valve 38 or any other flow control valve capable of regulating the rate of flow of a gas. A pipe 39 on the outlet side of the needle valve 38 is connected through a flow meter 40 that indicates the rate of flow of gas through it, and thence through a check valve 41 to a suitable pipe fitting such as a T 42 that connects the pipe 39 to the pipe 17.

OPERATION

With this carbon dioxide injection system 30 installed, it is possible to manufacture carbonated ice cream in a continuously operating system with a continuously flowing output. It should be noted that the invention is not limited to the manufacture of carbonated ice cream, but applies equally well to the manufacture of any dessert or confection.

The normal ice cream, dessert or confection ingredients are maintained in constant supply within the mix tank 11. With the shut off valve 13 open, these ingredients are drawn by the pump 15 through the pipe 12, and the pump 15 positively pumps the ingredients to the pipe 17. The second pump 19 sucks these ingredients through it from the pipe 17 and, since the pump 19 is of greater capacity than the first pump 15, the pump 19 creates a net suction pressure within the pipe 17 drawing carbon dioxide gas from the pipe 39 which is connected by the fitting 42 to the pipe 17.

The carbon dioxide is kept available in the surge chamber 35, and at the same time, the surge chamber dampens and absorbs the pressure variations produced by the pulsations of the pumps 15 and 19 and maintains a substantially constant pressure on the regulator 32. Since the regulator 32 operates best when its discharge pressure does not fluctuate too rapidly, the surge chamber 35 is necessary to isolate the regulator from the fluid pulsations originating in the freezer barrel. The needle valve 38 regulates the rate of flow of carbon dioxide from the surge chamber 35 as indicated by the flow meter 40 so that the proper proportions of carbon dioxide to ingredient mix can be established and maintained. The needle valve also provides enough restriction to maintain a slight positive presure in the surge chamber 35. The check valve 41 is present for sanitation purposes to prevent the flow of frozen dessert ingredients back into the carbon dioxide supply system.

The mixture of ingredients and carbon dioxide is pumped by the second pump 19 into the freezer barrel 23, the pumping action of the pump and the resistance of the spring loaded valve 24 maintaining a super-atmospheric pressure within the barrel 23. The contents within the barrel 23 are refrigerated to the desired temperature for forming the necessary final consistency of the frozen dessert and are whipped by the agitator or beater within the barrel 23. The refrigeration also aids in dissolving of the carbonation into the liquid frozen dessert ingredients. As is conventional, the ingredients within the barrel 23 are constantly moved from the inlet 22 toward the outlet 25 so that the product at the outlet 25 has been refrigerated under pressure and whipped into the desired and proper consistency.

Various changes and modifications may be made within the purview of this invention as will be readily apparent to those skilled in the art. Such changes and modifications are within the scope and teaching of this invention as defined by the claims appended hereto.

What is claimed is:

1. A carbon dioxide injection system adapted to be connected to a dessert making machine of the kind having a freezer barrel wherein dessert ingredients are refrigerated and whipped, a source of dessert ingredients, pump means for pumping the dessert ingredients from the said source to the said barrel, and valve means on the outlet side of the freezer barrel for maintaining the presure within the barrel at a predetermined minimum value, and, when that pressure is above the predetermined minimum value, permitting continuous or substantially continuous flow of the final dessert product from the freezer barrel, the injection system comprising: a carbon dioxide tank, means to regulate the pressure at the outlet from the carbon dioxide tank, pipe means leading from the regulator and adapted to be connected to the dessert making machine at a point where the suction pressure created by the pump means is sufficient to pump carbon dioxide into mixture with the dessert ingredients, a surge chamber between the regulator and the said connection for damping pressure variations produced by the pressure variations within the freezer barrel and the pulsations of the pump means and for maintaining a substantially constant load pressure on the regulator, the regulator thereby supplying carbon dioxide at a substantially constant pressure, and valve means in the pipe means to control the rate of flow of carbon dioxide and to maintain a minimum pressure within the surge chamber.

2. The combination of claim 1 wherein the pump means comprises two separate pumps connected in series with the downstream pump having greater pumping capacity than the upstream pump, the point at which the pipe means are adapted to be connected being between the two pumps.

3. The combination of claim 1 including a spring loaded valve on the outlet side of the freezer barrel for maintaining a predetermined minimum pressure within the freezer barrel.

4. The combination of claim 1 including a check valve in the said pipe means for preventing flow of the fluid ingredients to the carbon dioxide source.

References Cited

UNITED STATES PATENTS

| | | | |
|---|---|---|---|
| 57,412 | 8/1866 | Van Der Weyde | 103—224 |
| 3,015,218 | 1/1962 | Wakeman | 62—70 X |
| 3,256,100 | 6/1966 | Bernstein et al. | 62—342 X |
| 3,303,786 | 2/1967 | Fanshawe | 103—223 X |
| 3,330,127 | 7/1967 | Wakeman et al. | 62—69 |

WILLIAM E. WAYNER, Primary Examiner

U.S. Cl. X.R.

62—70; 103—224; 261—140